(12) United States Patent
Yoon et al.

(10) Patent No.: US 11,810,549 B2
(45) Date of Patent: Nov. 7, 2023

(54) SPEECH RECOGNITION USING FACIAL SKIN STRAIN DATA (71) Applicants: Samsung Electronics Co., Ltd., Suwon-si (KR); Seoul National University, R&DB Foundation, Seoul (KR)

(72) Inventors: Sungroh Yoon, Seoul (KR); Eunji Kim, Seoul (KR); Heeseung Kim, Seoul (KR)

(73) Assignees: Samsung Electronics Co., Ltd., Gyeonggi-do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 245 days.

(21) Appl. No.: 17/337,921

(22) Filed: Jun. 3, 2021

(65) Prior Publication Data

US 2022/0262344 A1  Aug. 18, 2022

(30) Foreign Application Priority Data

Feb. 18, 2021  (KR) .................. 10-2021-0021910

(51) Int. Cl.
*G10L 15/22* (2006.01)
*G10L 15/06* (2013.01)
*G10L 15/16* (2006.01)

(52) U.S. Cl.
CPC .......... *G10L 15/063* (2013.01); *G10L 15/16* (2013.01); *G10L 15/22* (2013.01); *G10L 2015/223* (2013.01); *G10L 2015/227* (2013.01)

(58) Field of Classification Search
CPC ........ G10L 15/063; G10L 15/22; G10L 15/16
See application file for complete search history.

(56) References Cited

U.S. PATENT DOCUMENTS

| 8,082,149 B2 | 12/2011 | Schultz et al. |
| 9,945,739 B2 | 4/2018 | Jeon et al. |
| 2017/0224257 A1 | 8/2017 | Rogers |
| 2018/0164879 A1* | 6/2018 | Moffat ............... G06F 3/011 |
| 2019/0005947 A1* | 1/2019 | Kim ................. G10L 15/22 |
| 2021/0225367 A1* | 7/2021 | Moriya ............. G10L 15/197 |

FOREIGN PATENT DOCUMENTS

| JP | 2839983 B2 | 12/1998 |
| KR | 101785500 B1 | 10/2017 |
| KR | 101966519 B1 | 4/2019 |

* cited by examiner

*Primary Examiner* — Ibrahim Siddo
(74) *Attorney, Agent, or Firm* — HARNESS, DICKEY & PIERCE, P.L.C.

(57) ABSTRACT

A computing device trains a position optimization model for determining, from among a plurality of positions, one or more optimal positions on a face based on a training data set including facial skin strain data at the plurality of positions. The computing device trains a speech classification model for classifying a voice from the facial skin strain data based on the training data at the one or more optimal positions determined by the position optimization model among the training data set.

20 Claims, 8 Drawing Sheets

SPEECH RECOGNITION USING FACIAL SKIN STRAIN DATA

CROSS-REFERENCE TO RELATED APPLICATION

This application claims priority to and the benefit of Korean Patent Application No. 10-2021-0021910 filed in the Korean Intellectual Property Office on Feb. 18, 2021, the entire contents of which are incorporated herein by reference.

BACKGROUND (a) Field

The technique described below relates to speech recognition using facial skin strain data.

(b) Description of the Related Art

Various speech recognition techniques have been proposed for a computing device to recognize a talker's speech. Among the speech recognition technologies, a method of recognizing speech by receiving a voice as sound is widely used. Since such a method receives the voice through a microphone, the method may receive noise other than target voice to be recognized, which requires additional processing to remove the noise. Further, in an environment where sound transmission is difficult, such as in a noisy environment, speech recognition may be difficult since it may be difficult to distinguish between the target voice and noise. Further, this sound dependent method cannot be used for people with pronunciation and/or speech impairment.

A silent speech recognition method is used as another speech recognition technique. The silent speech recognition method may recognize speech using data such as electroencephalogram (EEG) and electromyogram (EMG). In these cases, a sensor may be directly attached to the face and/or head in order to measure the EEG or EMG, so a process of selecting a candidate position to attach the sensor to and then measuring the EEG or EMG from that position is required. If the candidate position is not a significant position for the silent speech recognition, recognition performance is degraded, so it is required to obtain data from a plurality of positions, which increases cost.

SUMMARY

Some example embodiments may provide computing devices, speech recognition apparatuses, or computer programs for silent speech recognition.

According to an example embodiment, a computing device may include a memory configured to store one or more instructions; and a processor configured to execute the one or more instructions may be provided. The processor may, by executing the one or more instructions, select first training data from a first training data set, the first training data set including facial skin strain data at a plurality of positions on a face; extract first features from the facial skin strain data, through a position optimization model; select one or more positions from among the plurality of positions through the position optimization model; classify a voice based on second features through the position optimization model, the second features including the first features at the one or more positions among the first features; calculate a loss of the position optimization model; and update the position optimization model based on the loss.

In some example embodiments, the processor may iterate the extracting the first features, the selecting the one or more positions, the classifying the voice, the calculating the loss, and the updating the position optimization model by selecting another first training data from the first training data set.

In some example embodiments, the processor may perform the iteration until the one or more positions selected through the position optimization model converge.

In some example embodiments, the loss may include a first loss associated with the classification of the voice and a second loss associated with the selection of the one or more positions.

In some example embodiments, the processor may calculate the second loss based on importance coefficients assigned to the one or more positions.

In some example embodiments, the processor may calculate the first loss based on a prediction value predicted by the classifying the voice from the second features and an actual voice corresponding to the first training data.

In some example embodiments, the updating the position optimization model includes reducing a number of the one or more positions to be selected.

In some example embodiments, the facial skin strain data may include time-series facial skin strain data. The first features may include features of the time-series facial skin strain data that change over time.

In some example embodiments, the time-series facial skin strain data at each of the plurality of positions may represent position change over time of two points on the face with a corresponding position as a midpoint.

In some example embodiments, the processor may determine, from among the plurality of positions, one or more optimal positions through the position optimization model; select second training data from the first training data set; extract, from among the second training data, third features from the facial skin strain data at the one or more optimal positions through a speech classification model; classify a voice from the third features at the one or more optimal positions through the speech classification model, calculate a loss of the speech classification model, and update the speech classification model based on the loss of the speech classification model.

In some example embodiments, the processor may calculate the loss of the speech classification model based on a prediction value predicted by the classifying the voice from the third features at the one or more optimal positions and an actual voice corresponding to the second training data.

In some example embodiments, the processor may determine, from among the plurality of positions, one or more optimal position among the plurality of positions through the position optimization model; select second training data from a second training data set, the second training data set including facial skin strain data at the one or more optimal positions on the face; extract third features from the facial skin strain data at the one or more optimal positions of the second training data through a speech classification model; classify a voice from the third features at the one or more optimal positions through the speech classification model; calculate a loss of the speech classification model; and update the speech classification model based on the loss of the speech classification model.

According to another example embodiment, a computing device including a memory configured to store one or more instructions; and a processor configured to execute the one or more instructions may be provided. The processor may, by executing the one or more instructions, receive facial skin strain data at one or more designated positions on a face of a user, the facial strain data based on an image obtained by photographing the face uttering a voice; and recognize the voice based on the facial skin strain data using a first machine learning model.

In some example embodiments, the one or more designated positions may be determined, from among a plurality of positions on the face, by a second machine learning model.

In some example embodiments, the second machine learning model may be trained by selecting training data from a training data set; extracting first features from the facial skin strain data at the plurality of positions in the training data through the second machine learning model; selecting one or more positions from among the plurality of positions through the second machine learning model; classifying a voice from second features through the second machine learning model, the second features including the first features at the one or more positions; calculating a loss of the second machine learning model; and updating the second machine learning model based on the loss.

In some example embodiments, the first machine learning model is trained by selecting training data from a training data set; extracting features from the facial skin strain data at the one or more designated positions of the training data through the first machine learning model, classifying a voice from the features at the one or more designated positions through the first machine learning model, calculating a loss of the first machine learning model, and updating the first machine learning model based on the loss.

According to yet another embodiment, a computer program stored on a non-transitory computer-readable medium may be provided. The computer program may be executable by a computing device to cause the computing device to train a position optimization model configured to determine one or more optimal positions, from among a plurality of positions on a face, based on a training data set, the training data set including facial skin strain data at the plurality of positions; and train a speech classification model configured to classify a voice from the facial skin strain data based on the training data at the one or more optimal positions.

In some example embodiments, the computer program, when training the position optimization model, may cause the computer device to select first training data from the training data set; extract first features from the facial skin strain data at the plurality of positions in the first training data through the position optimization model; select one or more positions from among the plurality of positions through the position optimization model; classify a voice, based on second features, through the position optimization model, the second features including the first features at the one or more positions; calculate a loss of the position optimization model, and update the position optimization model based on the loss.

In some example embodiments, the loss may include a first loss associated with the classification of the voice and a second loss associated with the selection of the one or more positions In some example embodiments, the computer program, when training the speech classification model may be configured to cause the computing device to select second training data from the training data set; extract features from the facial skin strain data, at the one or more optimal positions of the second training data, through the speech classification model; classify a voice from the features at the one or more optimal positions through the speech classification model; calculate a loss of the speech classification model; and update the speech classification model based on the loss of the speech classification model.

DETAILED DESCRIPTION OF THE EMBODIMENTS

In the following detailed description, only certain example embodiments of the present invention have been shown and described, simply by way of illustration. As those skilled in the art would realize, the described embodiments may be modified in various different ways, all without departing from the spirit and/or scope of the present invention. Accordingly, the drawings and description are to be regarded as illustrative in nature and not restrictive. Like reference numerals designate like elements throughout the specification.

As used herein, a singular form may be intended to include a plural form as well, unless the explicit expression such as "one" or "single" is used.

In will be understood that, although the terms first, second, etc., may be used herein to describe various elements, steps, and/or operations, these elements, steps, and/or operations should not be limited by these terms. Rather, these terms are only used to distinguish one element, step, and/or operation from another element, step, and/or operation. Thus, a first element, step, and/or operation could be termed as a second element, step, and/or operation without departing from the teaching of the present inventive concept.

The sequence of operations or steps is not limited to the order presented in the claims or figures unless specifically indicated otherwise. For example, the order of operations or steps may be changed, several operations or steps may be merged, a certain operation or step may be divided, and/or a specific operation or step may not be performed.

Figure 1:
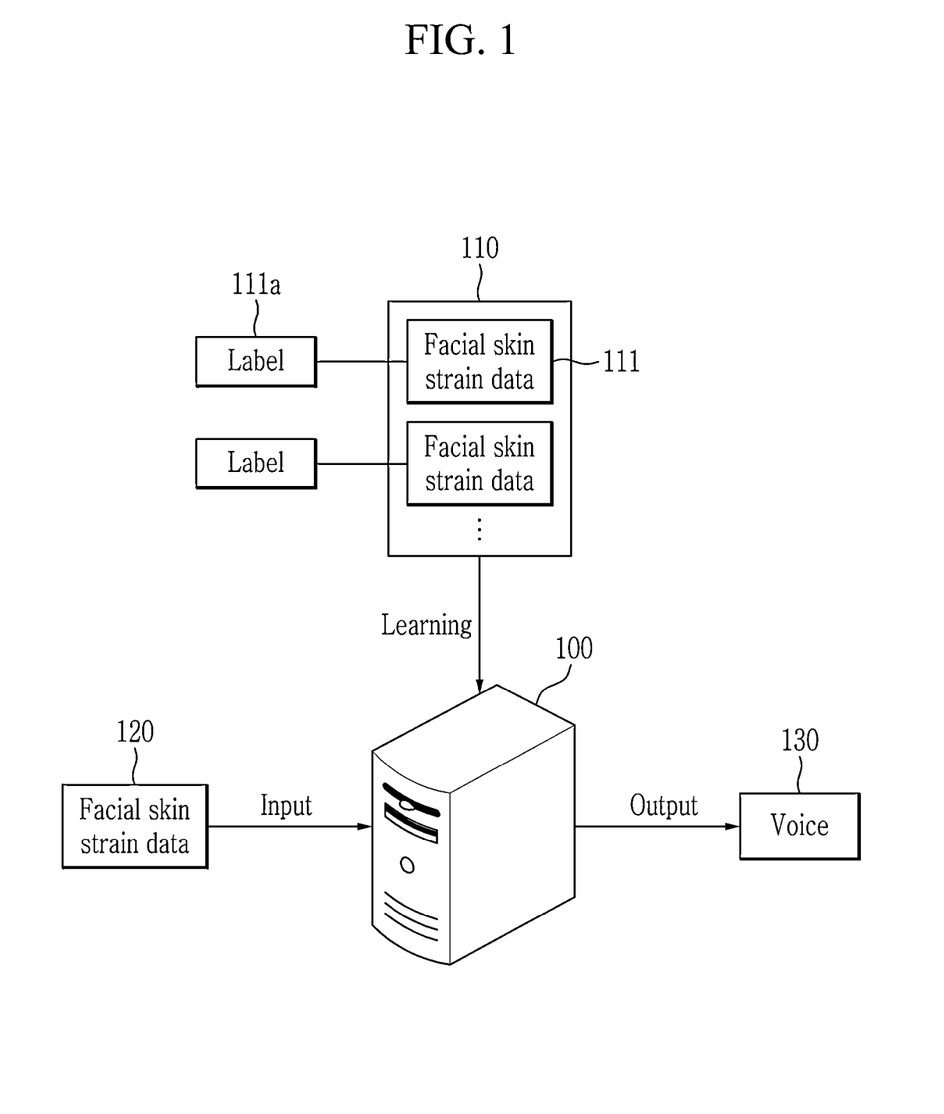
FIG. 1 is a drawing showing an example of a learning apparatus and a learning environment according to some embodiments.

FIG. 1 is a drawing showing an example of a learning apparatus and a learning environment according to some embodiments.

Referring to FIG. 1, a learning apparatus 100 for speech recognition is a computing device that performs machine learning on a neural network to perform a target task. In some embodiments, the target task may include a task related to speech recognition. In one embodiment, the task related to speech recognition may include a task for speech recognition and a task for optimal position search.

Although FIG. 1 shows the learning apparatus 100 is implemented as one computing device by way of example, in an actual physical environment, functions of the learning apparatus 100 may be implemented by a plurality of computing devices, for example using distributed and/or network computing such as cloud computing.

The learning apparatus 100 may train a neural network using a data set 110 including a plurality of training samples (e.g., training data). Each training sample may include facial skin strain data 111 to which a label 111a (e.g., a correct answer) is annotated. The label 111a may be, for example, a voice corresponding to the training sample. In some embodiments, the voice corresponding to the training sample may be a vowel value. For example, the voice corresponding to the training sample may be any one of 'a', 'e', 'i', 'o', and/or 'u'. In some embodiments, the facial skin strain data 110 may include facial skin strain data at a plurality of positions on a face. In some embodiments, the learning apparatus 100 may predict a value by inputting the training sample 111 to the neural network and performing the target task, and train the neural network by back-propagating a loss of the neural network including a loss between the predicted value and the label 111a annotated in the training sample 111 to the neural network.

In some embodiments, the target task may include a task for recognizing speech. In some embodiments, the target task may further include a task for determining an optimal position for the speech recognition from among the plurality of positions on the face.

The learning apparatus 100 may predict a result 130 (e.g., an uttered voice) by performing the target task by inputting facial skin strain data 120 of a user uttering the voice to the trained neural network. In this way, the learning apparatus 100 may recognize the voice by performing the target task based on the trained neural network.

Figure 2:
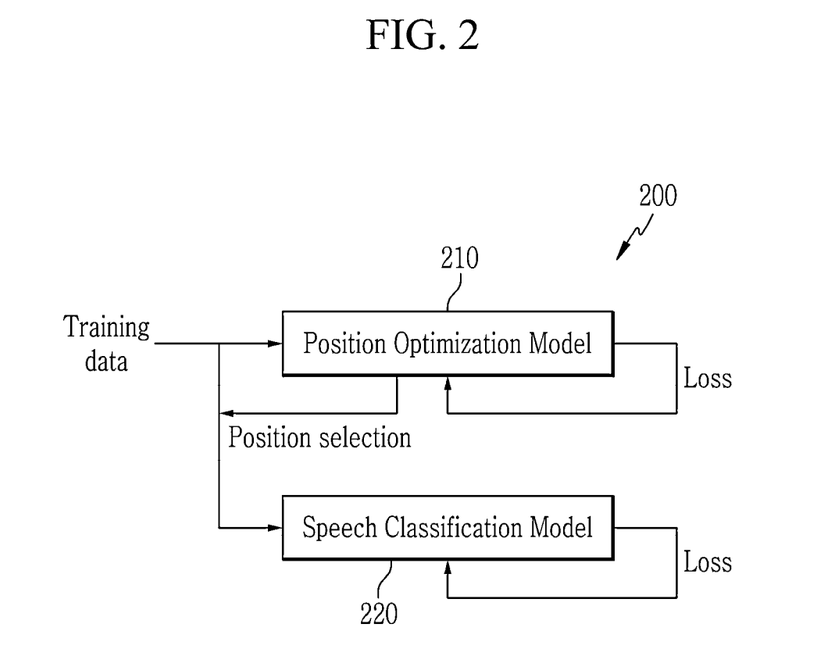
FIG. 2 is an example block diagram showing a speech recognition model of a learning apparatus according to some embodiments.
Figure 3:
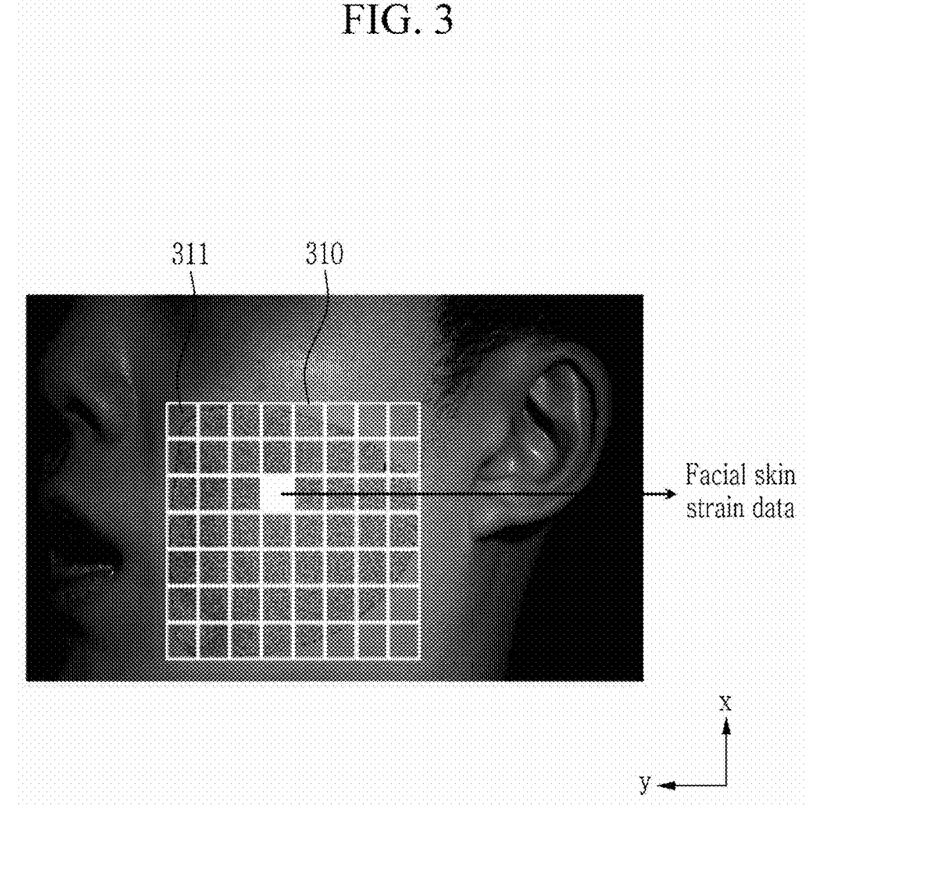
FIG. 3 is a drawing explaining an example of collecting time-series facial skin strain data.

FIG. 2 is an example block diagram showing a speech recognition model of a learning apparatus according to some embodiments, and FIG. 3 is a drawing explaining an example of collecting time-series facial skin strain data.

Referring to FIG. 2, a speech recognition model 200 may include a position optimization model 210 and a speech classification model 220.

In some embodiments, the position optimization model 210 and the speech classification model 220 may be implemented based on a machine learning model included in a neural network. For example, the neural network may include a deep neural network (DNN) and/or n-layer neural network. The DNN and/or n-layer neural network may correspond to a convolution neural network (CNN), recurrent neural network (RNN), deep belief network, restricted Boltzmann machine, and/or the like.

Alternatively and/or additionally, such artificial intelligence architecture systems may include other forms of machine learning models, such as linear and/or logistic regression, statistical clustering, Bayesian classification, decision trees, dimensionality reduction such as principal component analysis, and expert systems; and/or combinations thereof, including ensembles such as random forests. In some example embodiments, the artificial intelligence architecture systems may include a pooling layer, a fully connected layer, and/or the like in addition to a plurality of convolution layers.

In the speech recognition model 200, time-series facial skin strain data may be provided as training data. The time-series facial skin strain data may include data time-series facial skin strain data at a plurality of positions. As labels of the time-series facial skin strain data, voices (e.g., vowels) uttered when time-series facial seal data are collected are annotated. In some embodiments, the facial skin strain data may be extracted from a facial image obtained by photographing a human face. In some embodiments, the facial skin strain data may be obtained through a digital image correlation (DIC) scheme.

Referring to FIG. 3, in some embodiments, time-series facial skin strain data may be collected at each of a plurality of positions 311 on a face. For convenience of explanation, it is shown in FIG. 3 that a predetermined (or otherwise desired) area 310 of the face is divided at predetermined (or otherwise desired) intervals in an x-axis direction (e.g., horizontal direction) and at predetermined (or otherwise desired) intervals in a y-axis direction (e.g., vertical direction) so that the plurality of positions 311 are set. The time-series facial skin strain data may be obtained by collecting changes in facial muscle movement according to voice utterance at the corresponding position 311. In some embodiments, the vocal utterance may be vowel utterance. In some embodiments, the facial skin strain data at each position 311 may be obtained from two points with the corresponding position 311 therebetween, for example as a midpoint. For example, when the position 311 is the midpoint of two points (x1,y1) and (x2,y2) on the face, the facial skin strain data at that position 311 may represent position changes of the two points (x1,y1) and (x2,y2) when the voice is uttered. The time-series facial skin strain data at the corresponding position 311 may be obtained by measuring the position changes over time. In some embodiments, the two points may include two points whose y-axis coordinates are the same (e.g., two points in the x-axis direction), two points whose x-axis coordinates are the same (e.g., two points in the y-axis direction), or two points whose x-axis and y-axis coordinates are different from each other. In some embodiments, the intervals in the x-axis direction and the intervals in the y-axis direction may be equal and/or different. In some embodiments, the positions 311 may be arranged in a rectangular grid, but are not limited thereto. For example, the positions 311 may be in a rhomboid grid, a triangular grid, and/or the like.

Referring to FIG. 2 again, the position optimization model 210 includes a model for searching for an optimal position for speech recognition from the time-series facial skin strain data at the plurality of positions. The optimal position may include one or more positions. For example, the optimal position may include one or more position (311 of FIG. 3) wherein the facial skin strain data includes a characteristic of a voice utterance. For example, the optimal position may include a position for determining a particular utterance (e.g., one of 'a', 'e', 'i', 'o', and/or 'u') and/or positions wherein a comparison of the position indicates and/or distinguishes particular utterances. In some embodiments, the position optimization model 210 may select some positions from among the plurality of positions, and predict (e.g., classify) the voice based on the time-series facial skin strain data at the selected positions. The some positions may include one or more positions. In some embodiments, the learning apparatus may train the position optimization model 210 by back-propagating a loss that occurs according to selection of the some positions and prediction of the speech to the position optimization model 210. In some embodiments, the loss may be an indication of the difference between the prediction and a label of the training data. The loss of the position optimization model 210 is described below in further detail, with regards to FIG. 6. The learning apparatus may find the optimal position among the plurality of positions according to training of the position optimization model 210.

The speech classification model 220 includes a model for classifying speech based on the time-series facial skin strain data at the optimal position determined in the position optimization model 210 among the time-series facial skin strain data at the plurality of positions. In some embodiments, the speech classification model 220 may predict (e.g., classify) the voice based on the time-series facial skin strain data at the position selected by a mask learned in the position optimization model 210. In some embodiments, the learning apparatus may train the speech classification model 220 by back-propagating a loss occurring according to prediction of the voice to the speech classification model 220. The speech classification model 220 may then be used to determine a voice based on the time-series facial skin strain data.

As such, it is possible to perform the silent speech recognition by using the facial skin strain data without using sound.

Figure 4:
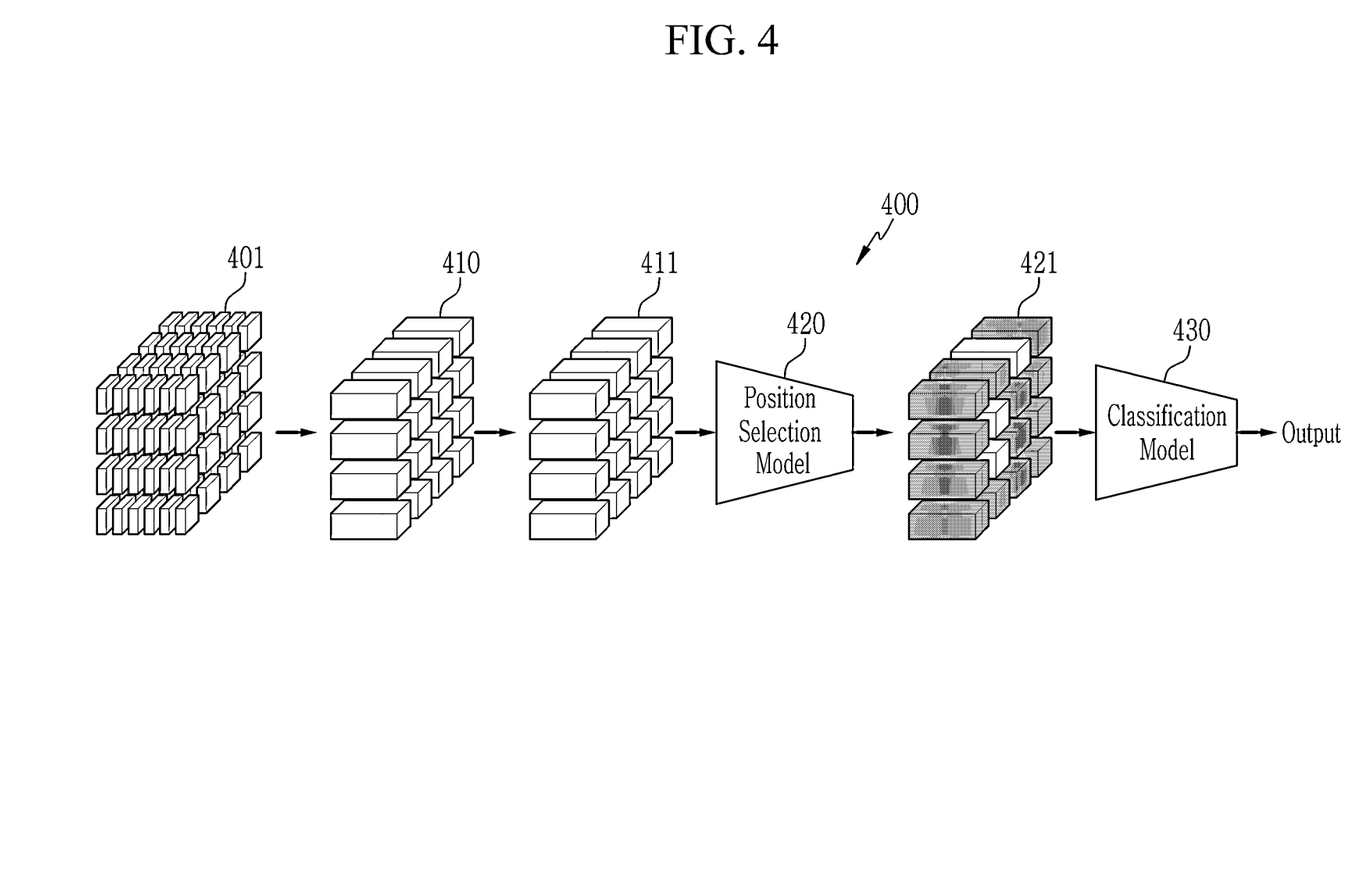
FIG. 4 is a drawing showing an example of a position optimization model in a learning apparatus according to some embodiments.

FIG. 4 is a drawing showing an example of a position optimization model in a learning apparatus according to some embodiments.

Referring to FIG. 4, a position optimization model 400 includes a feature extraction model 410, a position selection model 420, and a classification model 430.

As described with reference to FIG. 2, time-series facial skin strain data 401 at a plurality of positions are provided as training samples (e.g., input data) in the position optimization model 400.

The feature extraction model 410 extracts a feature of a change in strain (e.g., strain change feature) over time from the time-series facial skin strain data 401 at each position and outputs a feature map 411. The feature map may include strain change features at the plurality of positions. In some embodiments, the strain change feature at each position may be expressed as a feature vector. In some embodiments, the feature extraction model 410 may include an autoregressive model.

The position selection model 420 selects important positions from the feature map 411 extracted from the feature extraction model 410 and outputs a feature map 421 at the selected positions. The important positions may include one or more positions. In some embodiments, the position selection model 420 may output a feature map 421 masked by applying a mask for selecting important positions in the feature map 411 to the feature map 411. In some embodiments, the masked feature map 421 may include a feature vectors at selected positions and may, for example, not include features vectors at unselected positions.

The classification model (e.g., classifier) 430 performs speech classification from the masked feature map 422 and outputs a voice prediction value. In some embodiments, the classification model 430 may perform vowel classification from the masked feature map 422 and output a vowel prediction value. In addition, when training the position optimization model 400, the position selection model 420, and/or the classification model 430 may calculate a loss and back-propagating the loss into the position optimization model 400. In some embodiments, the loss may include a loss due to voice prediction and a loss due to position selection. In some embodiments, the loss due to voice prediction may include a loss between a voice value labeled in the input facial skin strain data and the voice prediction value of the classification model 430. The loss due to position selection may include a loss occurring based on the position selection by the mask. In some embodiments, the loss due to position selection may be calculated so that the position optimization model 400 can be trained to reduce the number of positions to be selected.

In some embodiments, when an importance coefficient representing the importance of each of a plurality of positions is assigned to a corresponding position, the position selection model 420 may select some positions based on the importance coefficients. The importance coefficient may be a value between 0 and 1, and/or may be expressed as a weight indicating the importance of the position. For example, the loss due to position selection may be calculated based on the importance coefficients of the selected positions. In some embodiments, the classification model 430 may calculate the loss due to voice prediction, and the position selection model 420 may calculate the loss due to position selection.

The learning apparatus may update the feature extraction model 410, the position selection model 420, and/or the classification model 430 based on the back-propagated loss. In some embodiments, the position selection model 420 may update the importance coefficients based on the back-propagated loss. In some embodiments, the learning apparatus may update weights used in the feature extraction model 410, the position selection model 420, and/or the classification model 430.

The learning apparatus may determine an optimal position among the plurality of positions by training the position optimization model 400 using a plurality of training samples. For example, the optimal position may be based on the importance coefficients of the plurality positions. The optimal position may include one or more positions. In some embodiments, the learning apparatus may determine a mask for selecting the optimal position by training the position optimization model 400.

Figure 5:
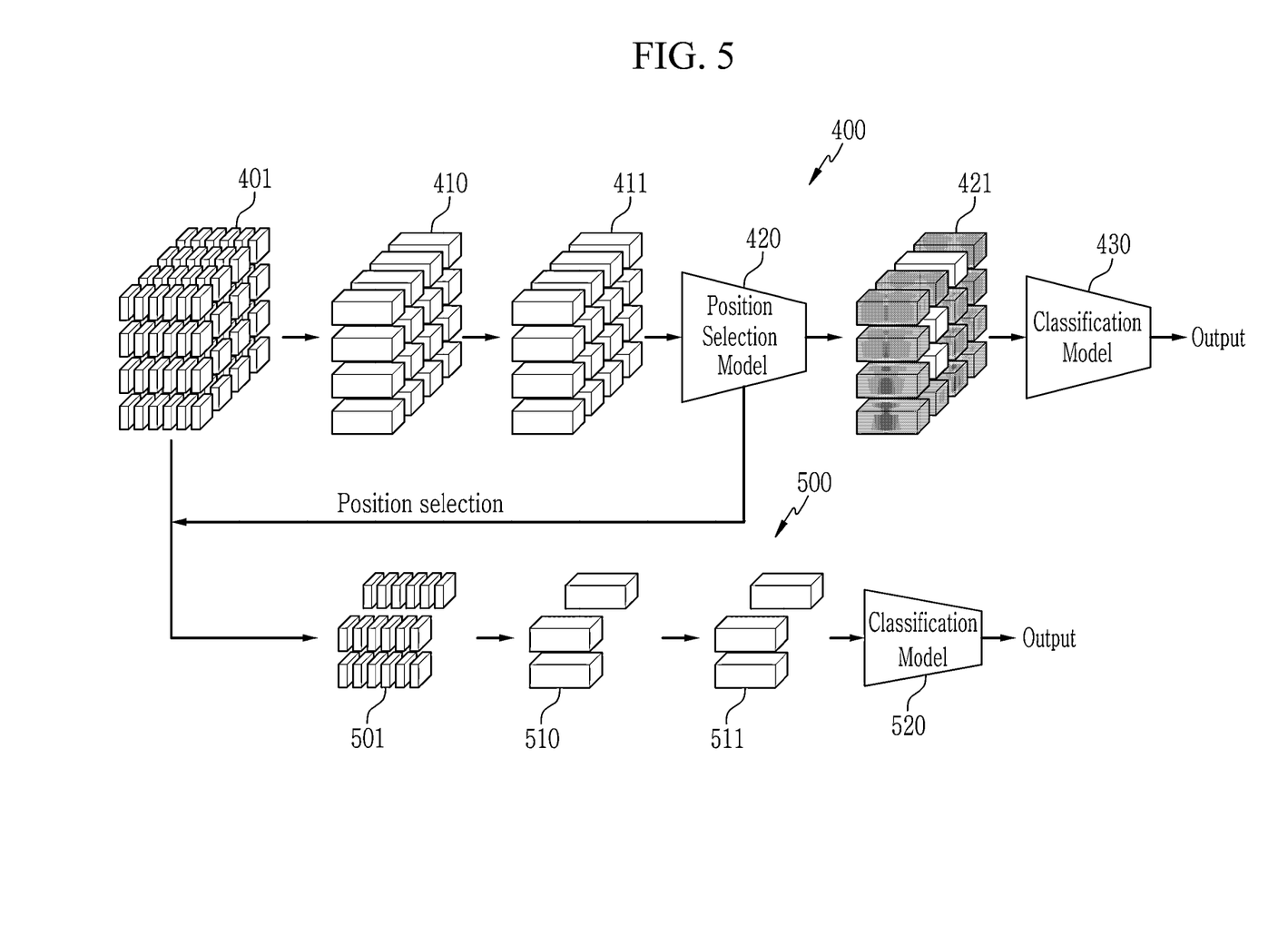
FIG. 5 is a drawing showing an example of a speech classification model in a learning apparatus according to some embodiments.

FIG. 5 is a drawing showing an example of a speech classification model in a learning apparatus according to some embodiments.

Referring to FIG. 5, a speech classification model 500 includes a feature extraction model 510 and a classification model 520.

In the speech classification model 500, time-series facial skin strain data at optimum positions among time-series facial skin strain data at a plurality of positions are provided as training samples (e.g., input data). In some embodiments, time-series facial skin strain data at the optimal position selected by a position optimization model (e.g., position selection model 420) among the time-series facial skin strain data 401 at the plurality of positions may be provided as the input data. In FIG. 5, the position optimization model 400 described with reference to FIG. 4 is shown as an example of a position optimization model for optimal position selection, and thus further detailed descriptions thereof will be omitted.

The feature extraction model 510 extracts a feature of a change in strain (e.g., strain change feature) over time from the time-series facial skin strain data 501 at the one or more positions of the optimal position and outputs a plurality of feature vectors 511. The plurality of feature vectors 511 may include the strain change features at the one or more positions of the optimum position, and each feature vector 511 may represent the strain change feature at a corresponding position. In some embodiments, the feature extraction model 510 may include an autoregressive model.

The classification model (e.g., classifier) 520 performs speech classification based on the feature vectors 511 at the optimum positions and outputs a voice prediction value. In some embodiments, the classification model 520 may output a vowel prediction value by performing vowel classification based on the feature vectors 511. In addition, when training the speech classification model 500, the classification model 520 may calculate a loss and back-propagate the loss to the speech classification model 500. In some embodiments, the loss may include a loss due to voice prediction. In some embodiments, the loss due to voice prediction may include a loss between a voice value labeled in the input facial skin strain data and the voice prediction value of the classification model 520.

The learning apparatus may update the feature extraction model 510 and the classification model 520 based on the back-propagated loss. In some embodiments, the learning apparatus may update weights used in the feature extraction model 510 and the classification model 520.

As such, the learning apparatus may train the speech classification model 500 using a plurality of training samples.

The learning apparatus can recognize the voice using the trained position optimization model 400 and speech classification model 500. In some embodiments, the position optimization model 400 and the speech classification model 500 may be trained on the same computing device. In some embodiments, the position optimization model 400 and the speech classification model 500 may be trained on different computing devices.

In some embodiments, the learning apparatus may receive time-series facial skin strain data at a plurality of positions when the user utters a voice, extract the time-series facial skin strain data at the optimal position (e.g., the designated position(s)) determined by the position optimization model 400 among the time-series facial skin strain data at the plurality of positions, and input the time-series facial skin strain data at the optimal position to the speech classification model 500, thereby recognizing the voice. Accordingly, the learning apparatus can perform silent speech recognition based on an image obtained by photographing the user's face even if the user's voice is not input as sound. In some embodiments, the speech recognition may be performed in a different computing device from the learning apparatus that trains the position optimization model 400 and/or the speech classification model 500. The computing device that performs the speech recognition may be referred to as a speech recognition apparatus.

In some embodiments, the speech recognition apparatus may receive the time-series facial skin strain data at the optimal position determined by the position optimization model 400 when the user utters a voice, and input the time-series facial skin strain data at the optimal position to the speech classification model 500, thereby recognizing the voice. Accordingly, since it is sufficient to collect the facial skin strain data at the optimum position when collecting the time-series facial skin strain data, a load caused by collecting the facial skin strain data can be reduced.

Next, a learning method of a learning apparatus according to some embodiments is described with reference to FIG. 6 and FIG. 7.

Figure 6:
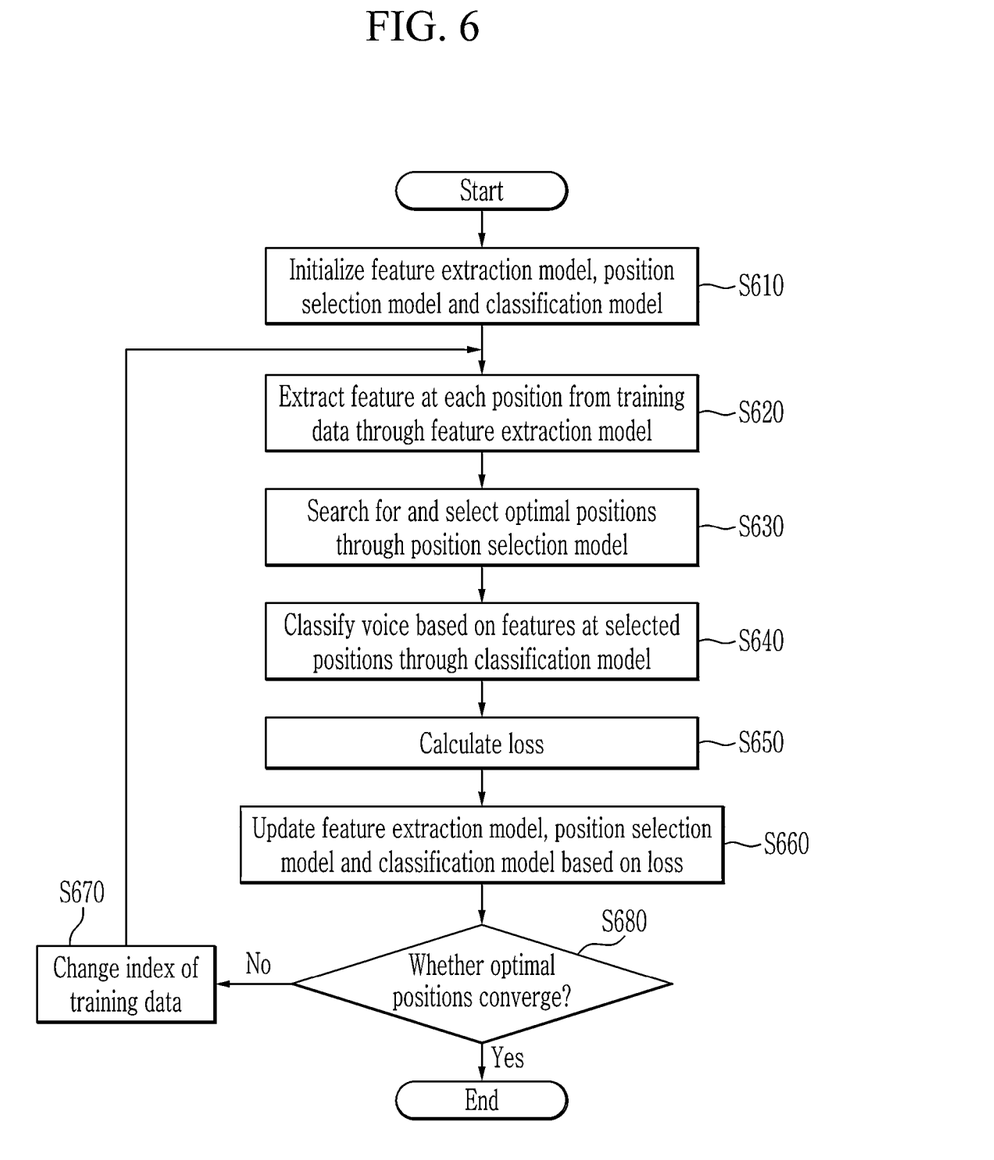
FIG. 6 is an example flowchart showing a learning method of a position optimization model according to some embodiments.

FIG. 6 is an example flowchart showing a learning method of a position optimization model according to some embodiments; Table 1 shows an example algorithm of a learning method of a position optimization model according to some embodiments; and FIG. 7 is an example flowchart showing a learning method of a speech classification model according to some embodiments.

Referring to FIG. 6 and Table 1, a learning apparatus may prepare a feature extraction model, a position selection model $\theta^s$, and/or a classification model $\theta^c$ for position optimization training. In Table 1, the feature extraction model is expressed as, for example, an autoregressive model. A training data set $D=\{(x_k^1, x_k^2, \ldots, x_k^n, y_k)\}_{k=1}^{len(D)}$ for position optimization training may be provided. In the training data set, k denotes an index of each training data (training sample) in the training data set, and len(D) denotes a size of the training data set. Further, $x_k^i$ denotes time-series facial skin strain data at a position having an index of i, and $y_k$ denotes a label of training data having an index of k. The feature extraction model (autoregressive model) may be expressed as a model $\{\theta_1^f, \theta_2^f, \ldots, \theta_n^f\}$ corresponding to n positions The learning apparatus first initializes the feature extraction model $\{\theta_1^f, \theta_2^f, \ldots, \theta_n^f\}$, the position selection model $\theta^s$, and/or the classification model $\theta^c$ at operation S610. In some embodiments, the feature extraction model $\{\theta_1^f, \theta_2^f, \ldots, \theta_n^f\}$, the position selection model $\theta^s$, and the classification model $\theta^c$ may be randomly initialized.

The learning apparatus extracts features from the time-series facial skin strain data (e.g., training data) at the n positions, respectively, through the feature extraction model $\{\theta_1^f, \theta_2^f, \ldots, \theta_n^f\}$ at operation S620. In some embodiments, the feature extracted from the time-series facial skin strain data at the ith position may be expressed as $f_i=\theta_i^f(x_k^i)$.

The learning apparatus searches for optimal positions based on the features (e.g., a feature map) $\{f_1, f_2, \ldots, f_n\}$ at the n positions through the position selection model $\theta^s$, and selects the searched positions at the n positions in operation S630. The searched positions may include one or more positions. In some embodiments, a set of selected positions may be expressed as $I(x_k)=\theta^s(f_1, f_2, \ldots, f_n)$.

The learning apparatus, through the classification model $\theta^c$, classifies a voice based on the features at the selected positions at operation S640. For example, the learning apparatus may recognize the voice based on the features at the locations selected through the classification model $\theta^c$ and output a predicted value of the voice (e.g., voice prediction value). In some embodiments, the voice prediction value may be expressed as $\hat{y}_k=\theta^c(\{f_i\}_{i \in I(x_k)})$.

The learning apparatus calculates a loss L of the position optimization model at operation S650. In some embodiments, the loss L of the position optimization model may include a loss Lcls due to voice prediction and a loss Lreg due to position selection. In some embodiments, the loss Lcls due to voice prediction may be calculated based on a loss between the voice prediction value $\hat{y}_k$ and the actual voice $y_k$ which is the label of training data having the index of k. In some embodiments, the loss Lreg due to position selection may be determined by the selected locations $I(x_k)$, and, for example, may be calculated based on importance coefficients assigned to the selected locations $I(x_k)$.

The learning apparatus may update the position optimization model (e.g., the feature extraction model $\{\theta_1^f, \theta_2^f, \ldots, \theta_n^f\}$), the position selection model $\theta^s$, and/or the classification model $\theta^c$ based on the loss L at operation S660. In some embodiments, the position optimization model may be updated to reduce the loss Lcls due to voice prediction and the loss Lreg due to location selection. In some embodiments, the position optimization model may be trained to converge the voice prediction value $\hat{y}_k$ towards the actual voice $y_k$ which is the label of training data having the index of k (for example, to increase a probability of a value corresponding to the actual voice in the voice prediction value). In some embodiments, the position optimization model may be trained to reduce the number of selected positions.

Next, the learning apparatus iterates the above-described operations while changing the index k of the training data (e.g., increasing the index k by one) at operation S670. In some embodiments, the learning apparatus may iterate the above-described operations until the optimal positions converge at operation S680.

TABLE 1

Algorithm 1: position optimization training procedure

Require: Autoregressive model $\{\theta_1^f, \theta_2^f, \ldots, \theta_n^f\}$, Selection model $\theta^s$, Classification model $\theta^c$, and dataset $D = \{(x_k^1, x_k^2, \ldots, x_k^n, y_k)\}_{k=1}^{len(D)}$ 1:   Randomly initialize $\{\theta_1^f, \theta_2^f, \ldots, \theta_n^f, \theta^s, \theta^c\}$
2:   k = 1
3:   while not converged do
4:     for i=1 to n do
5:       Get feature $f_i = \theta_i^f(x_k^i)$
6:     end for
7:     Select positions $I(x_k) = \theta^s(f_1, f_2, \ldots, f_n)$
8:     Recognize speech $\hat{y}_k = \theta^c(\{f_i\}_{i \in I(x_k)})$
9:     Compute $L = L_{cls}(\hat{y}_k, y_k) + L_{reg}(I(x_k))$
10:    Update $\{\theta_1^f, \theta_2^f, \ldots, \theta_n^f, \theta^s, \theta^c\}$ using L
11:    k = (k + 1) mod len(D)
12:  end while As described above, the learning apparatus can determine the optimal positions by training the position optimization model.

Figure 7:
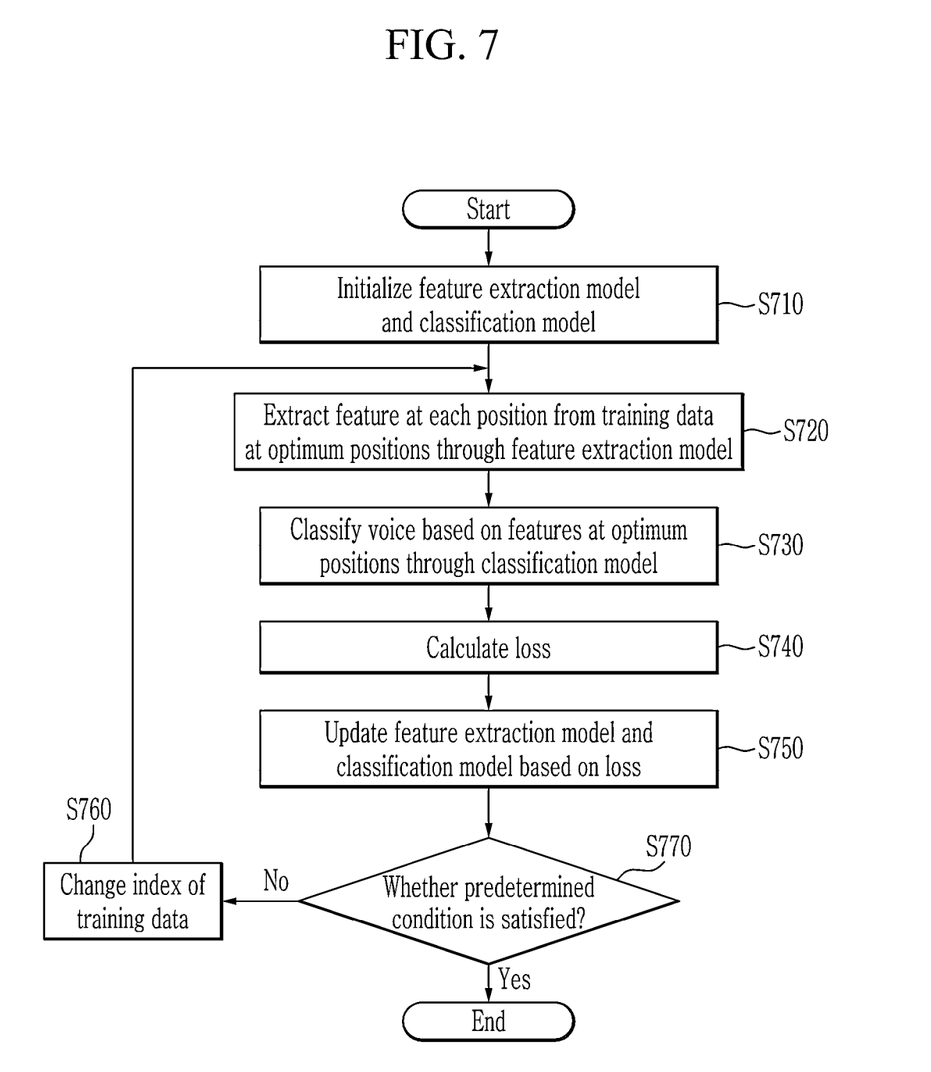
FIG. 7 is an example flowchart showing a learning method of a speech classification model according to some embodiments.

Referring to FIG. 7, a learning apparatus prepares a feature extraction model and a classification model $\theta^c$ for speech classification training. In some embodiments, a training data set $D = \{(x_k^1, x_k^2, \ldots, x_k^n, y_k)\}_{k=1}^{len(D)}$ may be provided as explained with reference to FIG. 6, and thus further detailed descriptions thereof will be omitted.

The learning apparatus may use training data at an optimal position among the training data. For example, the training data used by the learning apparatus may include only the training data at the optimal position. The optimal position may include one or more positions. In some embodiments, the optimal position may be positions selected by a position optimization model. When the optimal position is expressed as $I(x_k)$, the training data having an index of k at the optimal position may be expressed as $(\{x_k^i\}_{i \in I(x_k)}, y_k)$. In this case, the feature extraction model (e.g., autoregressive model) may be expressed as a model $\{\theta_i^f\}_{i \in I(x_k)}$ corresponding to the optimal position. In some embodiments, a training data set in which each training data include facial skin strain data at the optimal position may be used separately for the speech classification training. In some embodiments, when the training data set for the speech classification training is separately given, the training data set for the speech classification training and the training data set for the position optimization training may be combined to form one training data set.

The learning apparatus first initializes the feature extraction model $\{\theta_i^f\}_{i \in I(x_k)}$ and the classification model $\theta^c$ at operation S710. In some embodiments, the feature extraction model $\{\theta_i^f\}_{i \in I(x_k)}$ and the classification model $\theta^c$ may be randomly initialized.

The learning apparatus extracts features from the time-series facial skin strain data (training data) at the optimal position through the feature extraction model $\{\theta_i^f\}_{i \in I(x_k)}$ at operation S720. For example, in the case where the optimal position includes more than one position, the learning apparatus may extract the features from the time-series skin strain data at each of the positions of the optimal positions.

In some embodiments, the feature extracted from the time-series facial skin strain data at the ith position may be expressed as $f_i = \theta_i^f(x_k^i)$.

The learning apparatus classifies a voice based on the features at the optimal positions through the classification model $\theta^c$ at operation S730. For example, the learning apparatus recognizes the voice based on the features at the optimal positions through the classification model $\theta^c$ to output a predicted value of the voice (e.g., voice prediction value). In some embodiments, the voice prediction value may be expressed as $\hat{y}_k = \theta^c(\{f_i\}_{i \in I(x_k)})$.

The learning apparatus calculates a loss of the speech classification model at operation S740. In some embodiments, the loss Lcls of the speech classification model may include a loss due to voice prediction. In some embodiments, the loss Lcls due to voice prediction may be calculated based on a loss between the voice prediction value $\hat{y}_k$ and the actual voice $y_k$ which is the label of training data having the index of k.

The learning apparatus updates the speech classification model (e.g., the feature extraction model $\{\theta_i^f\}_{i \in I(x_k)}$) and/or the classification model $\theta^c$ based on the loss Lcls at operation S750. In some embodiments, the speech classification model may be updated to reduce the loss Lcls due to voice prediction. In some embodiments, the speech classification model may be trained to converge the voice prediction value $\hat{y}_k$ towards the actual voice $y_k$ which is the label of training data having the index of k (for example, to increase a probability of a value corresponding to the actual voice in the voice prediction value).

Next, the learning apparatus iterates the above-described operations while changing the index k of the training data (e.g., increasing the index k by one) at operation S760. In some embodiments, the learning apparatus may iterate the above-described operations at operation S770. In some embodiments, the learning apparatus may iterate the above-described operations until a predetermined or otherwise desired condition is satisfied. For example, the learning apparatus may iterate the above-described operations until the loss Lcls becomes less than or equal to a threshold value.

As described above, the learning apparatus can train the speech classification model so that the speech classification model can classify the voice corresponding to the actual voice.

Hereinafter, an example of a computing device 800 for implementing a learning apparatus or a leaning method according to some embodiments is described with reference to FIG. 8.

Figure 8:
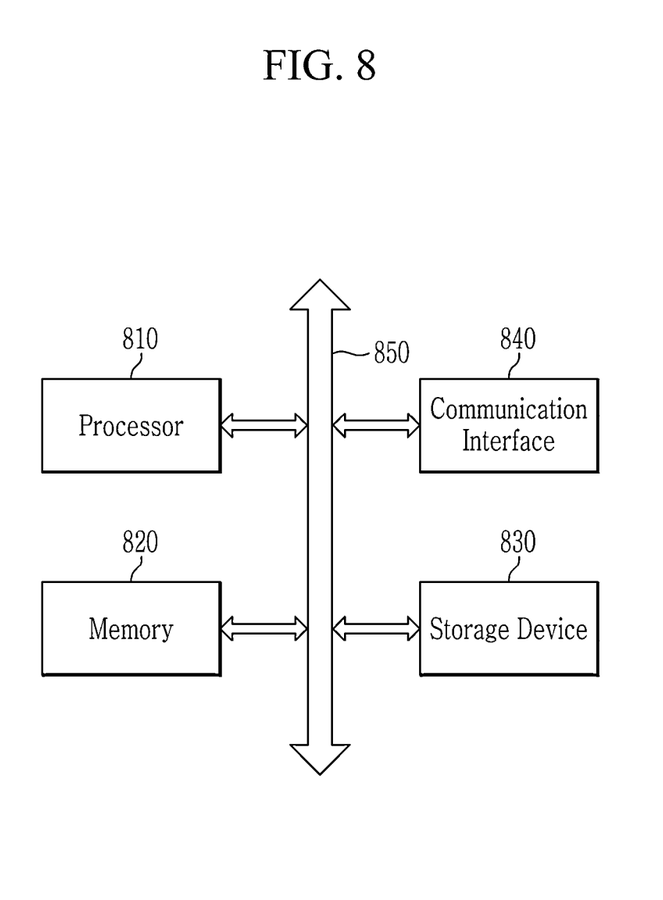
FIG. 8 is a drawing showing an example of a computing device according to some embodiments.

FIG. 8 is a drawing showing an example of a computing device according to some embodiments.

Referring to FIG. 8, a computing device 800 includes a processor 810, a memory 820, a storage device 830, a communication interface 840, and/or a bus 850. The computing device 800 may further include other general components (not illustrated).

The processor 810 may control the overall operation of each component of the computing device 800. The processor 810 may include hardware including logic circuits; a hardware/software combination such as a processor executing software; or a combination thereof. The processor 810 may be, for example, implemented with at least one of various processing units such as, for example, a central processing unit (CPU), a microprocessor unit (MPU), a micro controller unit (MCU), an arithmetic logic unit (ALU), a digital signal processor, a microcomputer, a field programmable gate array (FPGA), programmable logic unit, a microprocessor, application-specific integrated circuit (ASIC), an accelerator, and/or a graphic processing unit (GPU), and/or may be implemented with parallel processing units. In addition, the processor 810 may perform operations on a program for executing the above-described learning method.

The memory 820 stores various data, commands, and/or information. The memory 820 may load a computer program from the storage device 830 to execute the above-described learning method. The storage device 830 may include non-temporarily store the program. The memory 820 and/or the storage device 830 may include tangible and/or non-transitory computer-readable storage media, such as random access memory (RAM), read only memory (ROM), a permanent mass storage device (such as a disk drive, solid state (e.g., NAND flash) device, etc.), and/or any other like data storage mechanism capable of storing and recording data. In some embodiments, the storage device 830 may be implemented as a nonvolatile memory. Though illustrated as separate, in some embodiments, the memory 820 and the storage device 830 may be included in the same storage media.

The communication interface 840 supports wired or wireless Internet communication of the computing device 800. For example, the communication interface 840 may be and/or include a modem. In addition, the communication interface 840 may support various communication methods other than the Internet communication. In some embodiments, the communication interface 840 may include a user interface. The user interface may include a user input interface and/or a user output interface. For example, the user input interface may receive information from a user, and may include a keyboard, a camera, a mouse, a touch pad, a microphone, and/or the like. The user output interface may output information to the user and/or may include at least one of a monitor, a speaker, and/or the like. In some embodiments, facial skin strain data may be obtained through a camera included in and/or communicating through the communication interface 840. In some embodiments, a result of a speech classification may be provided to a user through the communication interface 840. For example, the result of the speech classification may be displayed on a monitor and/or output through the modem.

The bus 850 provides a communication function between components of the computing device 800. The bus 850 may be implemented as various types of buses such as an address bus, a data bus, and/or a control bus.

The computer program may include one or more instructions that cause the processor 810 to perform the learning method when loaded into the memory 820. For example, the processor 810 may perform operations for the learning method by executing the instructions.

In some embodiments, the computer program may include instructions of training a position optimization model for determining one or more positions, among a plurality of positions, as an optimal position based on a training data set including a plurality of training data, and training a speech classification model for classifying a voice from facial skin strain data based on the training data at the optimal position determined by the position optimization model.

In some embodiments, the computer program may include instructions of extracting features from facial skin strain data at a plurality of positions on a face, respectively, through a position optimization model (e.g., a feature extraction model), selecting one or more positions from among the plurality of positions through the position optimization model (e.g., a position selection model), classifying a voice based on the features at the one or more positions through the position optimization model (e.g., a classification model), calculating a loss of the position optimization model, and updating the position optimization model based on the loss.

In some embodiments, the computer program may include instructions of determining one or more positions, among a plurality of positions, as an optimal position through a position optimization model, extracting features from the facial skin strain data at the one or more optimal positions through the speech classification model (e.g., a feature extraction model), classifying a voice from the features at the one or more optimal positions through the speech classification model (e.g., classification model), calculating a loss of the speech classification model, and updating the speech classification model based on the loss of the speech classification model.

In some embodiments, the computer program may include instructions of receiving facial skin strain data at one or more designated positions on a face generated based on an image obtained by photographing the face of a user uttering a voice, and recognizing a voice based on the facial skin strain data using a machine learning model.

The learning method or learning apparatus according to some embodiments described above may be implemented as a computer-readable program on a computer-readable medium. In one embodiment, the computer-readable medium may include a removable recording medium and/or a fixed recording medium. In another embodiment, the computer-readable program recorded on the computer-readable medium may be transmitted to another computing device via a network such as the Internet, and/or may be installed in another computing device, so that the computer program can be executed by another computing device.

While this invention has been described in connection with what is presently considered to be practical embodiments, it is to be understood that the invention is not limited to the disclosed example embodiments. On the contrary, it is intended to cover various modifications and equivalent arrangements included within the spirit and scope of the appended claims.

What is claimed is:

1. A computing device comprising:
 memory configured to store one or more instructions; and
 a processor configured to, by executing the one or more instructions,
 select first training data from a first training data set, the first training data set including facial skin strain data from a plurality of positions on a face;
 extract first features from the facial skin strain data through a position optimization machine learning model trained to search for features of a voice in the facial skin strain data and to reduce the plurality of positions on the face to be considered to one or more positions based on a result of the search;
 reduce the plurality of positions on the face to be considered by selecting the one or more positions, from among the plurality of positions, as second features through the position optimization machine learning model;
 classify the voice based on the second features selected through the position optimization machine learning model, the second features including the first features at the one or more positions;
 calculate a loss of the position optimization machine learning model; and
 update the training of the position optimization machine learning model based on the loss.

2. The computing device of claim 1, wherein the processor is configured to iterate the extracting the first features, the selecting the one or more positions, the classifying the voice, the calculating the loss, and the updating the position optimization model by selecting another first training data from the first training data set.

3. The computing device of claim 2, wherein the processor is configured to perform the iteration until the one or more positions selected through the position optimization machine learning model converge.

4. The computing device of claim 1, wherein the loss includes a first loss associated with the classification of the voice and a second loss associated with the selection of the one or more positions.

5. The computing device of claim 4, wherein the processor is configured to calculate the second loss based on importance coefficients assigned to the one or more positions.

6. The computing device of claim 4, wherein the processor is configured to calculate the first loss based on a prediction value predicted by the classifying the voice from the second features and an actual voice corresponding to the first training data set.

7. The computing device of claim 1, wherein the updating the position optimization machine learning model includes reducing a number of the one or more positions to be selected.

8. The computing device of claim 1, wherein
the facial skin strain data include time-series facial skin strain data, and
the first features include features of the time-series facial skin strain data that change over time.

9. The computing device of claim 8, wherein the time-series facial skin strain data at each of the plurality of positions represent position changes over time of two points on the face with a corresponding position as a midpoint.

10. The computing device of claim 1, wherein the processor is configured to:
determine, from among the plurality of positions, one or more optimal positions through the position optimization machine learning model;
select second training data from the first training data set;
extract, from among the second training data, third features from the facial skin strain data at the one or more optimal positions through a speech classification machine learning model trained to determine the voice based on features of the voice in the facial skin strain data;
classify the voice from the third features at the one or more optimal positions through the speech classification machine learning model;
calculate a loss of the speech classification machine learning model; and
update the training of the speech classification machine learning model based on the loss of the speech classification machine learning model.

11. The computing device of claim 10, wherein the processor is configured to calculate the loss of the speech classification machine learning model based on a prediction value predicted by the classifying the voice from the third features at the one or more optimal positions and an actual voice corresponding to the second training data.

12. The computing device of claim 1, wherein the processor is configured to
determine, from among the plurality of positions, one or more optimal positions through the position optimization machine learning model;
select second training data from a second training data set, the second training data set including facial skin strain data at the one or more optimal positions on the face;
extract third features from the facial skin strain data at the one or more optimal positions of the second training data through a speech classification machine learning model;
classify the voice from the third features at the one or more optimal positions through the speech classification machine learning model;
calculate a loss of the speech classification machine learning model; and
update the speech classification machine learning model based on the loss of the speech classification machine learning model.

13. A speech recognition apparatus comprising:
a memory configured to store one or more instructions; and
a processor configured to, by executing the one or more instructions:
receive facial skin strain data at one or more designated positions on a face of a user, the facial skin strain data based on an image obtained by photographing the face uttering a voice; and
recognize the voice based on the facial skin strain data using a first machine learning model trained to recognize the voice based on features of the voice in the facial skin strain data,
wherein the one or more designated positions are determined, from among a plurality of positions on the face, by a second machine learning model.

14. The speech recognition apparatus of claim 13, wherein the second machine learning model is configured to search for the features of the voice in the plurality of positions and to reduce the plurality of positions to the one or more positions based on a result of the search.

15. The speech recognition apparatus of claim 13, wherein the second machine learning model is trained by:
selecting training data from a training data set;
extracting first features from the facial skin strain data, at the plurality of positions in the training data, through the second machine learning model;
selecting one or more positions from among the plurality of positions through the second machine learning model;
classifying a voice from second features through the second machine learning model, the second features including the first features at the one or more positions;
calculating a loss of the second machine learning model; and
updating the second machine learning model based on the loss.

16. The speech recognition apparatus of claim 13, wherein the first machine learning model is trained by:
selecting training data from a training data set;
extracting features from the facial skin strain data at the one or more designated positions of the training data through the first machine learning model;
classifying a voice from the features at the one or more designated positions through the first machine learning model;
calculating a loss of the first machine learning model; and
updating the first machine learning model based on the loss.

17. A computer program stored on a non-transitory computer-readable medium, wherein the computer program, when executed by a computing device, is configured to cause the computing device to:

train a position optimization machine learning model based on a training data set including facial skin strain data at a plurality of positions, such that the position optimization machine learning model is configured to search for features of a voice in the facial skin strain data and to reduce the plurality of position to one or more positions based on a result of the search; and train a speech classification machine learning model configured to determine the voice from the facial skin strain data based on the training data at the one or more optimal positions.

18. The computer program of claim 17, wherein the computer program, when training the position optimization machine learning model, is configured to cause the computing device to:

select first training data from the training data set;

extract first features from the facial skin strain data at the plurality of positions in the first training data through the position optimization machine learning model;

select one or more positions, from among the plurality of positions, through the position optimization machine learning model;

classify the voice, based on second features, through the position optimization machine learning model, the second features including the first features at the one or more positions;

calculate a loss of the position optimization machine learning model; and update the position optimization machine learning model based on the loss.

19. The computer program of claim 18, wherein the loss includes a first loss associated with the classification of the voice and a second loss associated with the selection of the one or more positions.

20. The computer program of claim 17, wherein the computer program, when training the speech classification machine learning model, is configured to cause the computing device to:

select second training data from the training data set;

extract features from the facial skin strain data, at the one or more optimal positions of the second training data, through the speech classification machine learning model;

classify a voice from the features at the one or more optimal positions through the speech classification machine learning model;

calculate a loss of the speech classification machine learning model; and update the speech classification model based on the loss of the speech classification machine learning model.

* * * * *